United States Patent [19]

Heard

[11] 4,336,606
[45] Jun. 22, 1982

[54] WIND SPEED MEASUREMENT

[75] Inventor: Maurice C. Heard, Hullbridge, England

[73] Assignee: The Marconi Company Limited, Chelmsford, England

[21] Appl. No.: 189,914

[22] Filed: Sep. 23, 1980

[30] Foreign Application Priority Data

Sep. 25, 1979 [GB] United Kingdom ................. 7933161

[51] Int. Cl.³ ........................ G01S 11/00; G01W 1/00
[52] U.S. Cl. ...................................... 367/117; 73/189; 73/861.31; 343/5 W
[58] Field of Search ............... 367/117, 129, 135, 191, 367/89, 90; 73/189, 861.27, 861.28, 861.29, 861.31, 170 R; 343/5 W; 181/0.5; 244/114 R

[56] References Cited

U.S. PATENT DOCUMENTS

| 2,928,277 | 3/1960 | Cavanagh et al. | 73/189 X |
| 4,058,010 | 11/1977 | Woodhouse | 73/189 |
| 4,174,630 | 11/1979 | Nicoli | 73/189 X |
| 4,222,265 | 9/1980 | Ravussin | 73/170 R |

Primary Examiner—Richard A. Farley
Attorney, Agent, or Firm—Spencer & Kaye

[57] ABSTRACT

Wind is the large-scale movement of air from one place to another. It is usual for the air to become horizontally stratified, the layers nearer the ground moving more slowly than or in a different direction to those higher up. This change of wind speed with height is known as wind gradient (or wind shear), and it may cause serious problems for aircraft during their approach and landing. Unfortunately, at present there is no satisfactory way of ascertaining the wind gradient situation.

The invention provides acceptable apparatus for, and a method of, actually detecting—and preferably measuring—wind gradient at a location, and involves a comparison of the wind speed in the same direction at two or more heights at the location, this comparision being upon the basis of a comparison of the speed of sound in that direction and at those heights, a difference in the apparent speeds indicating the presence of wind gradient. The invention involves: beaming a regular sound wave train between a transmitter/receiver pair positioned and like orientated at each of two or more heights at the location; noting each transceiver pair's received sound wave train phase, and comparing it with its transmitted phase, so as to deduce the wind-caused phase change; and using these deduced phase changes to calculate the actual wind speeds, and thus the relative changes of wind speed with height, in the selected direction.

10 Claims, 3 Drawing Figures

WIND SPEED MEASUREMENT

BACKGROUND OF THE INVENTION

1. Field of the Invention

This invention concerns wind speed measurement, and relates in particular to the detection and/or measurement of wind gradient.

Wind is the large-scale movement of air from one place to another. Though for most purposes it may be convenient to visualize this movement as being that of a block of air, the air in any one part of the block being stationary with respect to the air in any other part so that all parts of the block move over the ground with the same velocity, in fact this is generally not the case. Instead, it is usual—especially in the case of wind blowing across large open spaces—for the air to become horizontally stratified; indeed, it may be regarded as a series of layers parallel to the ground and moving at different velocities, the layers nearer the ground moving more slowly (because of friction or viscosity effects) than those higher up. Thus, a 30 knot wind moving across an airfield (say) would truly have a speed of 30 knots at a height of 50 feet and above, but at 20 feet its speed might only be 25 knots, at 10 feet 20 knots—and close to ground level the air speed might only be 10 knots. This change of wind speed with height is known as wind gradient (or wind shear), and it may cause serious problems for aircraft during their approach and landing.

As is well known, all aircraft deriving their lift purely by virtue of the passage of air across their wings have a critical angle of attack (the angle the wing chord makes with the direction of motion) beyond which the wing lift produced suddenly and disastrously decreases by a large amount. The resultant rather precipitous tendency of the aircraft to fall out of the sky is known as a stall, and the angle of attack at which the stall occurs is referred to as the stall angle. The stall angle is in fact more or less independent of flying speed, but in general stalling occurs most commonly at a very low flying speed, which speed is thus referred to (inaccurately, though understandably) as the stalling speed. Both the stall angle and the stalling speed vary with aircraft type; a glider trainer may have a stalling speed as low as 30 knots, while a modern light aircraft may stall at 55 knots. A Jumbo Jet may have a stalling speed as high as 100 knots.

As stated above, a conventional aircraft is kept up by the lift resulting from air moving across its wings, and this lift is directly related to the speed of this air movement. Hence, a satisfactory guide to the aircraft's lift situation is its speed through the air—its airspeed. In most cases the relation of an aircraft's airspeed to its ground speed (its speed over the ground) is unimportant as regards its ability to keep flying. At the moment of landing, however, the situation is different.

It is general practice to land an aircraft by flying it down to just above ground level at an airspeed slightly above stalling speed, and then to allow the airspeed to drop slowly until the aircraft sinks onto the runway. Ideally the airspeed should then drop below stalling speed to prevent the aircraft bouncing back into the air. If the aircraft tries to land with too high an airspeed it keeps on flying—at ground level—any may reach the end of the runway before it can actually land, slow down, and stop. If, on the other hand, it tries to land with too low an airspeed it may stall onto the runway from a significant height. A Jumbo Jet may have a stalling speed of 100 knots but a landing speed of only 110 knots; it can easily be appreciated that even a slight error in the airspeed of a Jumbo on its landing approach may have disastrous results. Unfortunately, it is at this critical moment that wind gradient effects can exacerbate the situation. Taking the case of the Jumbo referred to above landing through a head wind with the gradient also referred to above, it can easily be seen that an airspeed at 50 feet of 110 knots (into a 50 ft. level head wind of 30 knots this gives a true ground speed of $110-30=80$ knots) becomes—because of the wind gradient change of wind speed with height—a near ground level airspeed of 90 knots (the true ground speed of 80 knots plus the near ground level headwind of 10 knots). This is 10 knots below the aircraft's stalling speed, and the result is somewhat unfortunate! Naturally, the answer is to fly faster on the approach when landing through a wind gradient. The difficulty here, however, is that an extra 10 to 15 knots airspeed on the approach to allow for a wind gradient that may not after all exist could mean running off the end of the runway—which would also be somewhat unfortunate.

2. Description of The Prior Art

The problem can only really be solved by ascertaining the wind gradient situation, but at the moment there is no satisfactory way of doing this. It might be thought that wind speed could be measured at different heights directly using a series of vertically-separated anemometers of the standard drag-cup type, but in fact these instruments are incapable of giving a result of the required accuracy and reliability, and it is common to present to "measure" wind gradient on the highly unsatisfactory basis of reports from the pilots of aircraft that have already landed. The present invention seeks to provide acceptable apparatus for, and a method of, actually detecting—and preferably measuring—wind gradient, and is based upon the apparent speed of sound in air between two fixed points being affected by the motion of the air relative to the points.

SUMMARY OF THE INVENTION

In one aspect, therefore, this invention provides a method for detecting wind gradient at a location, in which method there is effectively compared the wind speed in the same direction at two or more heights at the location, this comparison being upon the basis of a comparison of the speed of sound in that direction and at those heights, a difference in the apparent speeds indicating the presence of wind gradient.

The speed of sound in air along a line or path between any two points may be determined by measuring the time taken for the sound to travel between the two points. With the air moving from one point to the other, sound travelling in the same direction is speeded up, while sound travelling in the other direction is slowed down. Where the actual wind has a speed W in a direction which is at an angle $\theta$ to the sound speed line, then the wind component along that line is $W \cos \theta$. In such a case, the sound speed S along the line is $S_o + W \cos \theta$ (where $S_o$ is the sound speed in still air). If the distance over which the sound speed is being measured is D, then the time T taken is D/S—thus, $T = D(S_o + W \cos \theta)^{-1}$. In this way sound speeds at different heights—which speeds may be different because of different wind speeds at these heights—may be compared by comparing the times taken at those different heights (and in a comparison—rather than a measurement—there is no need to know the actual distance between the two points). Further, while the time can be determined with reference to a particular burst of sound, or with reference to some particular feature of a continuous sound wave, using such a method to compare sound speed/time differences caused by wind speed changes at different heights is rather difficult in view of the very small time differences involved. It is therefore preferred to determine the sound speeds on the basis of a measurement of the phase changes observed in a regular sound wave train (the wave train's velocity will be advanced or retarded, depending on wind direction, by the speed of the wind component along the wave train line). The presence of a phase difference between two heights indicates that there is a wind gradient. An actual measurement of this difference gives the wind gradient, though not (by itself) the absolute wind speeds; this latter can be found either by computation based upon a knowledge of the absolute wind speed and direction at one of the heights, or (as is preferred) by computation based upon actual measurement not only of the phase difference at different heights but also of the phase change—from still air to windy—at each height.

More specifically, therefore, the method of the invention comprises the steps of:

(a) beaming a regular sound wave train between a transmitter/receiver pair positioned and like orientated at each of two or more heights at the location;

(b) noting each transceiver pair's received sound wave train phase, and comparing it with its transmitted phase, so as to deduce the wind-caused phase change; and (c) using these deduced phase changes to calculate the actual wind speeds, and thus the relative changes of wind speed with height, in the selected direction.

The invention involves "measuring" the speed of sound in air. When the sound is in the form of a regular wave train it is preferred not to use subsonic or audio frequency (up to 20 KHz) sound—mainly because at these low frequencies the wavelength is long and the phase changes obtained in the preferred detection method are therefore small, and because the transceiver system employed would be very sensitive to noise (as arising from a passing aircraft)—and instead it is most convenient to use sound of ultrasonic frequencies. Moreover, within the broad range of "ultrasound", frequencies in the narrower range of 30 to 100 KHz are preferred; at the lower end the wavelength is small enough to enable easy phase change measurement, while at the upper end the attenuation (proportional to the square of the frequency) is not so great as to prevent satisfactory transception. A particularly convenient ultrasound frequency is in the region of 40 KHz.

In effecting the invention the speed of sound is measured at two or more different heights. As described hereinafter, these heights—and thus the paths along which the sound speed is measured—may be quite close. Accordingly, and in view of the poor directional accuracy and selectively of most sound transceiver systems, it is desirable that in order to avoid cross-coupling between sound traversing adjacent paths the sound used at each height be of a different frequency, and thus that the means for generating and detecting the sound be in essence a tuned circuit capable of a response which is acceptably selective to its own frequency but not to the frequencies used for the sound travelling along neighbouring paths. A frequency separation between adjacent transceiver pairs of about 100 Hz will normally be sufficient.

Though the sound whose speed is to be measured can be produced and detected in any convenient manner—using, for example, conventional loudspeakers and microphones—the preferred ultrasound wave train is advantageously generated mechanically by an air or vacuum-operated whistle/siren, for instance a Galton, Pohlman or Hartman Whistle (which all efficiently provide a high intensity ultrasound output), as described on pages 113-136, "Jet Generators, Ultrasonic Engineering", Butterworth 1955, and detected by a piezoelectric device, for instance a directional receiver having blade matching elements of the type described in a paper by Y. Sunthankar, IEEE 1974 Ultrasonics Symposium Proceedings, pp 684-687.

For any measurement of sound speed it is necessary to have a knowledge of the time of origination of the sound concerned (or, in the case of the preferred phase change method, a knowledge of the instantaneous phase of the transmitted sound for comparison with the instantaneous phase of the received sound). In carrying out the invention this is most conveniently achieved by having a suitable microphone immediately adjacent each sound source; the transmitter microphone's output is then used for the comparison/measurement.

The required measurement of the speed of sound is effected at two or more heights. Clearly, for any particular height span the greater the number of heights at which the measurement is carried out the better the "definition" of the results. Depending upon the actual heights involved, measurement at from two to six, especially four, heights seems at present to be quite acceptable. The choice of the actual heights depends slightly upon the number of heights and the type of situation the system is to fill (as a landing aid for Jumbos or for light aircraft, say), but in general where the system is for use as a aircraft landing aid there should be measurement at heights both above and below the "on-land" height of the wing of any aircraft likely to use the system. Thus, at a normal large commercial airport—where light aircraft are usually excluded, and the lowest "on-land" wing height is likely to be at least 2 meters, the highest being at least 5 meters—it is very desirable to have the upper and lower heights of 6 and 1 meters respectively. In such a case, and with measurement at four levels, it is convenient to have as the four heights 1,2,4 and 6 meters.

The measurement heights are, of course, all at the same location (rather than scattered about the airfield, say), and are generally disposed vertically above one another. However, in a practical situation (where a set of transceiver pairs is arranged as a linear array of transmitters facing a like linear array of receivers), it is advantageous to have the array leaning slightly into the wind direction in which there is most interest; the added separation of the sound paths marginally increases sensitivity. A satisfactory tilt angle is from 10° to 25°.

The location at which the speed of sound measurement is effected, and the direction in which it is carried out, naturally depends upon the exact application of the method. As an aircraft landing aid, however, it is convenient to have the location as near as possible—as near as it is safe to have a 6 meter high device, for example—to the nominal touchdown point (the runway threshold), and to have the direction be as nearly as possible along the actual landing flight path (thus, in line with the runway) so as to detect and/or measure as closely as possible the actual headwind up the runway. Safety restrictions generally require that there should be no tall objects within at least about 200 meters of the runway proper, so that the location will generally be at least 200—perhaps at least 300—meters in advance of the threshold. Similarly, the restrictions require that there should be no tall objects anywhere on or near the landing flight path within at least about 200 meters in advance of the threshold, so that it is not possible to measure sound speed along the flight path itself in or very close to the runway approach/undershoot area, and as a compromise it is preferred to measure sound speed at an angle across the flight path. Though in theory a small angle to the runway line would be best, in practice the problems involved in overcoming sound attenuation at the resulting necessarily large distance separating each sound source from its detector makes angles less than 30° rather unattractive. A convenient angle is in fact 45° to the runway line.

Thus, in a preferred case this invention might be used as an aircraft landing aid with the detection measurement location and direction about 300 meters back from the runway threshold between points 100 meters either side of the central flightpath line and at a 45° angle across that line.

It should here be noted, incidentally, that the invention detects and/or measures the wind speed component along the sound speed line, and naturally some computation is required to determine therefrom either the true wind speed or the wind's headwind component up the runway. Moreover, it will be observed that in the case where the wind is at right angles to the sound speed line the invention will indicate that there is no wind (or wind gradient) despite the fact that there may still be a considerable up-runway headwind. Though such an exact situation is unlikely, nevertheless it is most preferably provided for by effecting two sets of detection and/or measurement, the sound speed lines of one set being at right angles to those of the other, the two results then being averaged.

In effecting the invention for detecting wind gradient it is sufficient merely to observe that there is a difference in wind speed at the two or more selected heights. Conveniently, however, the difference is actually measured, so that the wind gradient may be quantified—and, knowing the wind speed at any one of the heights, be given as a set of absolute figures. In the most preferred embodiment of the invention, however, the wind speeds and the wind gradient are both determined at the same time; thus, the difference between still air and wind sound speeds gives the actual wind speed at each height, this information (which includes the speed difference between heights) being further processed to give the actual wind gradient. In all of these cases the computing is most advantageously effected using conventional equipment operating (directly or indirectly, as appropriate) upon the outputs from the detectors associated with each height—thus, with the two detectors corresponding to each transceiver pair. For example, when using the phase change method involving pairs of sound transmitters and receivers, the direct outputs from the two detectors of each pair are compared (utilising conventional phase lock loop electronics) to produce a single output indicative of the phase difference caused by wind speed, and this may in its turn be employed to control a display showing the actual wind speed at that level. By comparing different outputs, there may be observed the presence—and magnitude—of the wind gradient. Most conveniently, however, the computing of wind speeds and gradient is performed by a suitably pre-programmed microprocessor the output of which may be utilised to drive any appropriate form of display device—such as a digital liquid crystal visual display, an alpha/numeric or graphical cathode ray tube visual display, a printer, an automatic radio communication system, and/or an alarm.

The invention measures sound speed at two or more heights, and as so far described for use as a aircraft landing aid comprises a single vertical or near vertical line of transmitters on one side of the runway approach-/undershoot area facing a like line of receivers on the other side. A single line or set of transceiver pairs is not, however, entirely satisfactory, and to improve the confidence level in the results—and to cover against failure of any one pair—it is very much preferred to have at least two sets arranged side-by-side (thus, two lines of transmitters facing two lines of receivers) with a lateral separation of about 2 meters. Indeed, it is advantageous to have four sets so that—in the preferred case of each set having four transceiver pairs—the four lines of four form a roughly square array of sixteen transceiver pairs.

In another aspect, the invention provides apparatus for the detection of wind gradient at a location, which apparatus comprises:

means for comparing the speed of sound in the same direction at two or more heights at the location; and means for using a detected difference to indicate the presence of wind gradient.

More specifically, the invention provides apparatus for the detection and measurement of wind gradient at a location, which apparatus comprises:

means for transmitting and means for receiving a regular sound train, which two means are positioned facing each other, and like orientated in a selected direction, at each of two or more heights at the location;

means for noting the phase of each received sound wave train, for comparing that phase with the phase of the wave train as transmitted, and for thereby deducing the wind-caused phase change; and means for calculating from the deduced phase change at each height the wind speed in the selected direction at that height.

The various means for transceiving sound, for noting and comparing phase, for deducing phase change, and for calculating wind speed, have already been described hereinbefore.

BRIEF DESCRIPTION OF THE DRAWINGS

The invention is now described, though only by way of illustration, with reference to the accompanying drawings in which.

Where possible, the same reference numbers are used for the same items throughout.

DETAILED DESCRIPTION

Figure 1:
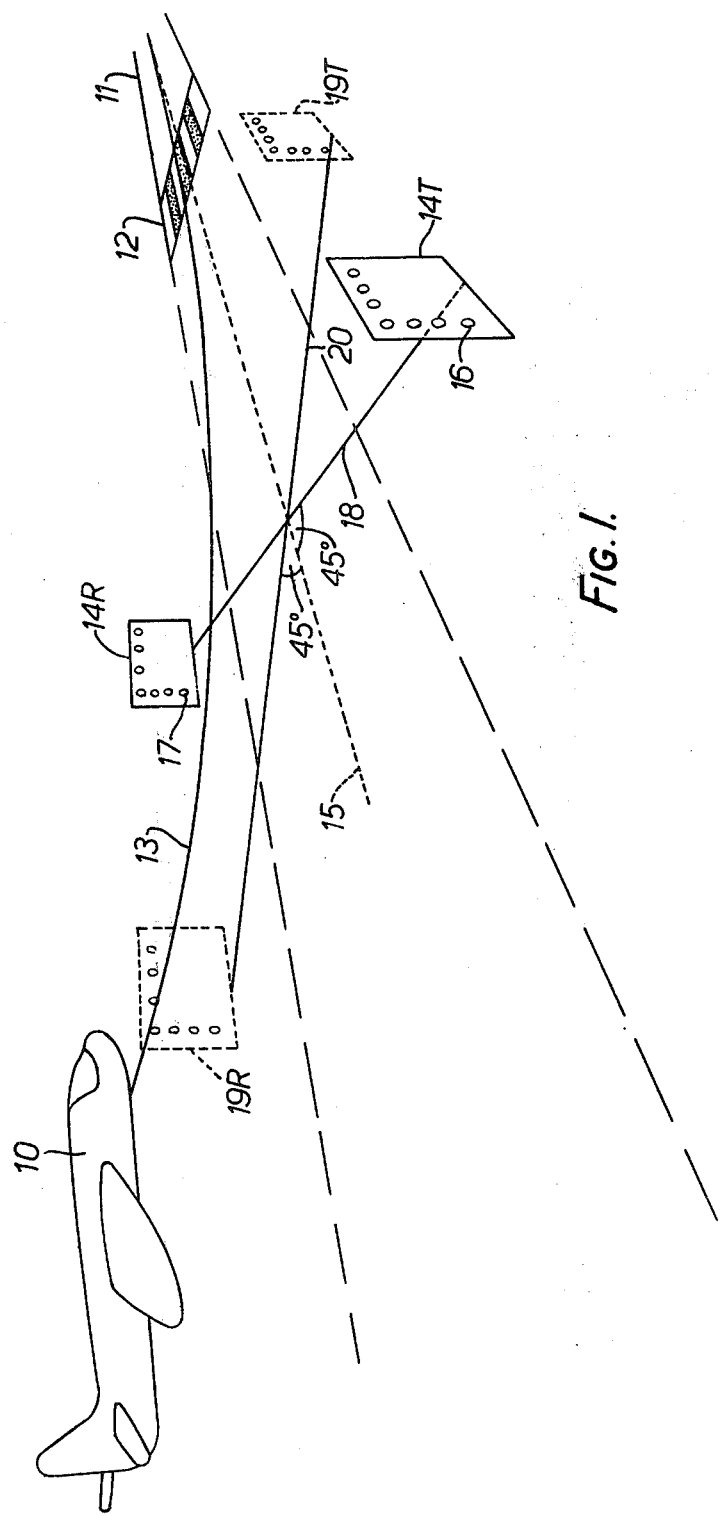
FIG. 1 is an exaggerated perspective view of the approach area of a runway equipped with the device of the invention.

FIG. 1 (which is not to scale) shows an aircraft (10) on its final approach to the runway (11). It is at a height of about 200 ft., approximately 1,500 ft. (450 meters) from the runway threshold (12), and its proposed flight path to touchdown is indicated by the line 13. On the ground between the aircraft 10 and the threshold 12 is a matched pair of ultrasound transmitter/receiver arrays (14T, 14R). Each array 14 is 100 meters away from the runway centre line extension (15), and the pair of arrays is (on average) 300 meters in advance of the threshold 12. The nearer array (as viewed; 14T) is an array of transmitters (as 16), while the further array (as viewed; 14T) is an array of receivers (as 17). The array pair 14 is matched in that for each transmitter 16 there is a receiver 17, and in that the arrays are correspondingly shaped, each comprising a set of four rows of four columns of transmitter/receiver elements 16/17 (for clarity only the first element in each row and column is shown). The transceiver elements in each column are at heights of 1,2,4 and 6 meters, and the columns are 2 meters apart. The individual transmitters 16 in array 14T "face" the corresponding individual receivers 17 in array 14R, but the arrays are in fact staggered across the runway approach area, and the configuration is such that a line (as 18) joining the two arrays crosses the approach at a 45° angle. It is in the direction of this line that the sound speed is measured.

Figure 3:
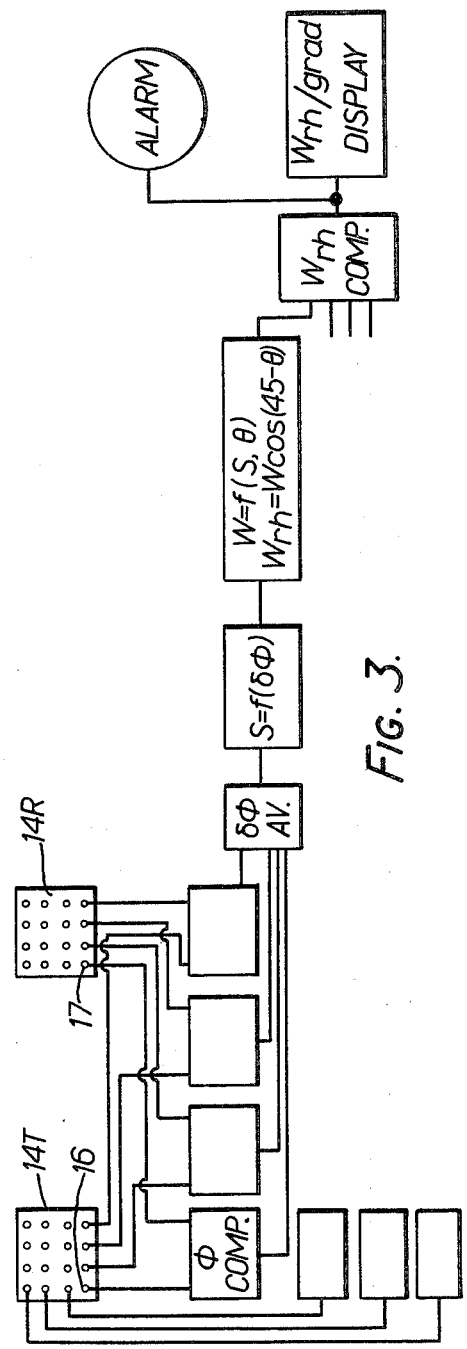
FIG. 3 is a schematic block diagram illustrating the main components of the device itself.

The array pair 14 is, of course, suitably connected to power input/signal output means (not shown in this Figure, though the signal output means, and associated circuitry, is shown in FIG. 3).

As will be appreciated, wind blowing from right to left of the Figure (as viewed) will cross the array pair 14 joining line 18 roughly at right angles, and so will have little or no component along that line; thus it will cause no sound speed change. To deal with this situation, a second, like, pair of arrays (19T, 19R; shown in dotted outline) is situated across the approach so that its joining line (20) also makes a 45° angle with the centre line 15 but in the opposite sense, and is thus at right-angles to the array pair 14 joining line 18. It will easily be understood that wind blowing directly across one array line (and causing no sound speed change) is blowing directly along the other (so causing the maximum sound speed change); by averaging the two results an acceptable output is observed whatever the wind direction.

Figure 2:
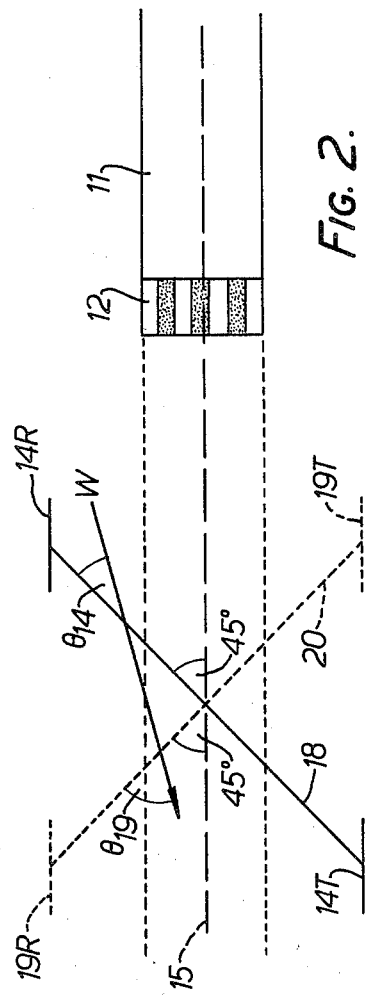
FIG. 2 is a plan view of the approach area.

FIG. 2 shows the approach area of FIG. 1 in plan (without the aircraft), and from this view there can more clearly be seen the disposition of the two array pairs 14 and 19.

Also in this Figure is shown the wind direction (depicted by arrow W). It will be noted that the wind crosses the array pair 14 joining line 18 at a fairly small angle ($\theta_{14}$), so having a large component along the line 18 from the receiver array 14R to the transmitter array 14T (and thus causing a reduction in the speed of sound travelling in the opposite direction). It will also be noted that the wind crosses the array pair 19 joining line 20 at a fairly large angle ($\theta_{19}$), so having only a small component along the line 20. Thus, in this case the array pair 14 will detect a large sound speed change, while the array pair 19 will detect only a small sound speed change. The two can be used in the manner described hereinbefore to give an average value for the wind speed.

The block diagram of FIG. 3 represents in schematic form the circuitry required to process the output of the transceiver array pair 14 to give an indication of wind gradient. Only part of the circuit is shown (the rest being similar, and thus left out for clarity) and there is not shown any of the circuitry for the other array pair 19.

Each transmitter in array 14T is generating a continuous regular sound wave train in the 40 KHz frequency region, the 16 transmitters in the array 14T having a stepped frequency spread of $16 \times 100$ Hz; the receivers in the array 14R are correspondingly tuned. The circuit part shown in full in FIG. 3 is essentially that for the transceiver element pair 16/17. The phase ($\phi$) of the output from the receiver 17 is compared with that of a "direct" output from the transmitter 16. This comparison is effected for each of the four bottom row transceiver pairs, and in each case the comparison results in a signal corresponding to the phase difference ($\delta\phi$). The four $\delta\phi$ signals are then averaged, and the resultant is processed to give a value for the actual speed of sound—$S = f(\delta\phi)$—between the transceiver row at that height. This value is then converted to a value for the true wind speed at that height—$W = f(S,\theta)$—and this is then further processed to give a value for the runway headwind component—$W_{rh} = W \cos 45$. Finally, the four headwind values (one for each height) are compared, and an output from this comparison drives a display system showing the headwind gradient, and—if the gradient is beyond a predetermined level—operates an alarm.

I claim:

1. Apparatus for the detection and measurement of wind gradient at a location, which apparatus comprises:
   means for transmitting and means for receiving a regular sound wave train, which two means are positioned facing each other, and like orientated in a selected direction, at each of two or more heights at the location;
   means for noting the phase of each received sound wave train, for comparing that phase with the phase of the wave train as transmitted, and for thereby deducing the wind-caused phase change; and
   means for calculating from the deduced phase change at each height the wind speed in the selected direction at that height.

2. Apparatus as claimed in claim 1, wherein the transmitting and receiving means employ sound of an ultrasonic frequency in the range of 30 to 100 KHz.

3. Apparatus as claimed in claim 1, wherein in order to avoid cross-coupling between sound traversing adjacent paths the sound used at each height is of a different frequency, and each pair of transmitting and receiving means is a suitably tuned circuit.

4. Apparatus as claimed in claim 1, wherein the transmitting means includes an air or vacuum-operated whistle/siren, and the receiving means includes a piezo-electric detector device.

5. Apparatus as claimed in claim 1, wherein there is a linear array of transmitters facing a like linear array of receivers, and each array leans slightly into the wind direction in which there is most interest.

6. Apparatus for the detection of wind gradient at a location, which apparatus comprises:
   at least one linear array of means for transmitting sound and at least one linear array of means for receiving sound, said arrays being positioned facing one another and being like oriented in a selected direction, said means forming transmitting means-receiving means pairs at each of at least two heights at the location;
   means for deriving from each said pair the speed of sound at the height of that pair;

means for comparing the speeds of sound derived from said pairs at different heights; and means for using a detected difference between the speeds derived at different heights to indicate the presence of wind gradient.

7. Apparatus as claimed in claim 6 which is for use as an aircraft landing aid, and which is located near to the nominal touchdown point (the runway threshold), the sound speed measurement direction being at about 45° to the runway line.

8. Apparatus for the detection of wind gradient at a location, which apparatus comprises:

two sets of sound transmitting and receiving means each said set being arranged for transmitting and receiving sound at two or more heights at the location and each said set serving to provide sound speed indications along an associated sound speed line, with the sound speed line of one said set being at right angles to that of the other said set;

means for averaging the results from said two sets;

means for comparing the speeds of sound in the same direction at the two or more heights; and means for using a detected difference to indicate the presence of wind gradient.

9. Apparatus for the detection of wind gradient at a location, which apparatus comprises:

at least two side-by-side vertical or near vertical linear arrays of transmitting means on one side of the location and a corresponding number of like side-by-side linear arrays of receiving means on the other side of the location for providing indications of the speed of sound in the same direction at two or more heights at the location;

means for comparing the speeds of sound at the two or more heights; and means for using the detected difference to indicate the presence of wind gradient.

10. Apparatus as claimed in claim 6, 8 or 9, wherein there are means for comparing the sound speed at up to six heights.

* * * * *